US011118678B2

(12) United States Patent
Ooshima et al.

(10) Patent No.: US 11,118,678 B2
(45) Date of Patent: Sep. 14, 2021

(54) VEHICLE CONTROL DEVICE AND VEHICLE CONTROL METHOD

(71) Applicant: ISUZU MOTORS LIMITED, Tokyo (JP)

(72) Inventors: Tatsuya Ooshima, Saitama (JP); Nobuyuki Nishimura, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 72 days.

(21) Appl. No.: 16/612,699

(22) PCT Filed: May 9, 2018

(86) PCT No.: PCT/JP2018/017923
§ 371 (c)(1),
(2) Date: Nov. 11, 2019

(87) PCT Pub. No.: WO2018/207816
PCT Pub. Date: Nov. 15, 2018

(65) Prior Publication Data
US 2020/0096097 A1    Mar. 26, 2020

(30) Foreign Application Priority Data
May 12, 2017 (JP) .............................. JP2017-095965

(51) Int. Cl.
  *F16H 61/16* (2006.01)
  *F16H 59/44* (2006.01)
  (Continued)

(52) U.S. Cl.
  CPC ............ *F16H 61/16* (2013.01); *F16H 59/18* (2013.01); *F16H 59/20* (2013.01); *F16H 59/44* (2013.01);
  (Continued)

(58) Field of Classification Search
  CPC .............. F16H 61/16; F16H 2061/161; F16H 2061/163; F16H 2061/166; F16H 59/18;
  (Continued)

(56) References Cited

U.S. PATENT DOCUMENTS 9,937,916 B2 * 4/2018 Burt ..................... F16H 61/16
10,428,937 B2 * 10/2019 Ishiguro ................ F16H 61/16
2014/0172252 A1 6/2014 Siegel et al.

FOREIGN PATENT DOCUMENTS

CN 104937315 A 9/2015
DE 102010008936 A1 8/2011
(Continued)

OTHER PUBLICATIONS

Office Action for related CN App. No. 201880030800.4 dated Jul. 3, 2020. English translation provided; 17 pages.
(Continued)

*Primary Examiner* — Erin D Bishop
(74) *Attorney, Agent, or Firm* — Procopio, Cory, Hargreaves & Savitch LLP

(57) ABSTRACT

This vehicle control device 10 is provided with: a current gear stage selection unit 13 which selects a current gear stage, which is the gear stage of the vehicle in the present travel state; a travel segment determination unit 15 which determines the next travel segment forwards in the direction of travel of the vehicle V; and a shift control unit 17 which, in the case that the current gear stage selection unit 13 has newly selected a target gear stage lower than the current gear stage during travel of the vehicle V in the current gear stage in the current travel segment, if the next travel segment can be traveled in the current gear stage and the amount the vehicle V will lose speed after traveling the current travel segment is less than or equal to a prescribed threshold value, controls shifting of the gear stage such that downshifting from the current gear stage to the target gear stage is
(Continued)

suppressed and the current gear stage is maintained. Even in a state in which downshifting is suppressed, if the state of the vehicle the satisfies a prescribed condition, then the shift control unit 17 controls shifting of the gear stage so as to downshift to the target gear stage without suppression of downshifting.

7 Claims, 6 Drawing Sheets

(51) Int. Cl.
| | |
|---|---|
| *F16H 59/66* | (2006.01) |
| *F16H 59/70* | (2006.01) |
| *F16H 61/02* | (2006.01) |
| *F16H 61/68* | (2006.01) |
| *F16H 59/20* | (2006.01) |
| *F16H 59/18* | (2006.01) |
| *F16H 61/00* | (2006.01) |
| *F16H 59/14* | (2006.01) |
| *F16H 59/36* | (2006.01) |

(52) U.S. Cl.
CPC .............. *F16H 59/66* (2013.01); *F16H 59/70* (2013.01); *F16H 61/0204* (2013.01); *F16H 61/68* (2013.01); *F16H 2059/142* (2013.01); *F16H 2059/366* (2013.01); *F16H 2059/663* (2013.01); *F16H 2059/666* (2013.01); *F16H 2061/0075* (2013.01); *F16H 2061/0234* (2013.01); *F16H 2061/161* (2013.01); *F16H 2061/163* (2013.01); *F16H 2061/166* (2013.01); *F16H 2306/20* (2013.01); *F16H 2708/24* (2013.01); *F16H 2710/22* (2013.01)

(58) Field of Classification Search
CPC .......... F16H 59/20; F16H 59/44; F16H 59/70; F16H 2059/366; F16H 2059/663
See application file for complete search history.

(56) References Cited

FOREIGN PATENT DOCUMENTS

| | | |
|---|---|---|
| JP | 05322028 A | 12/1993 |
| JP | 2005265147 A | 9/2005 |
| JP | 2005265148 A | 9/2005 |
| JP | 2014001824 A | 1/2014 |

OTHER PUBLICATIONS

International Search Report and Written Opinion for PCT App No. PCT/JP2018/017923 dated Jul. 31, 2018, 10 pgs.

* cited by examiner

[FIG. 1]
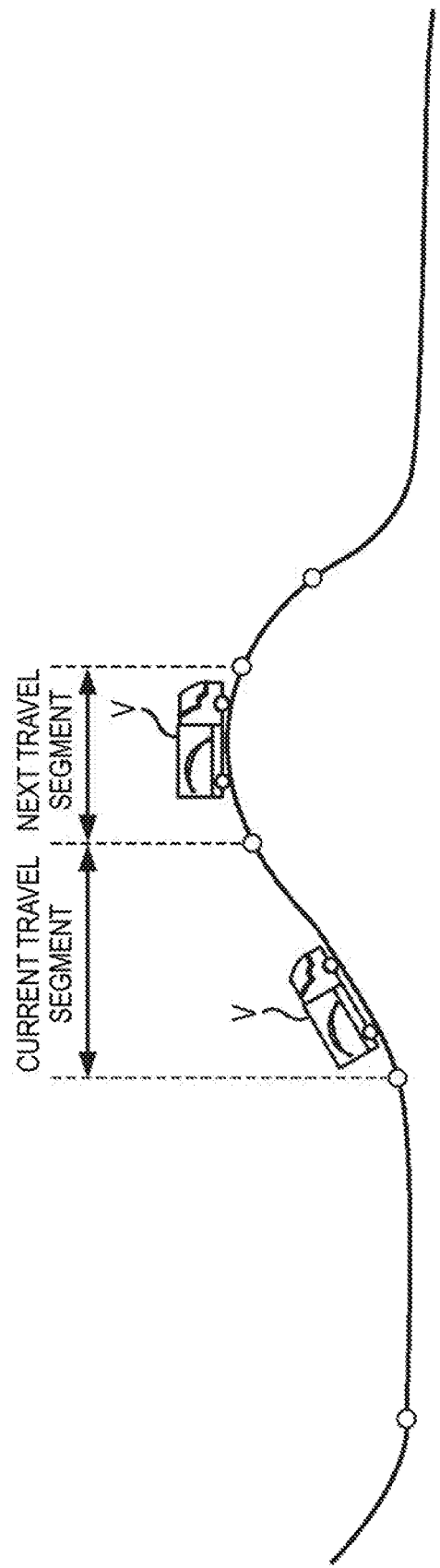

[FIG. 2]
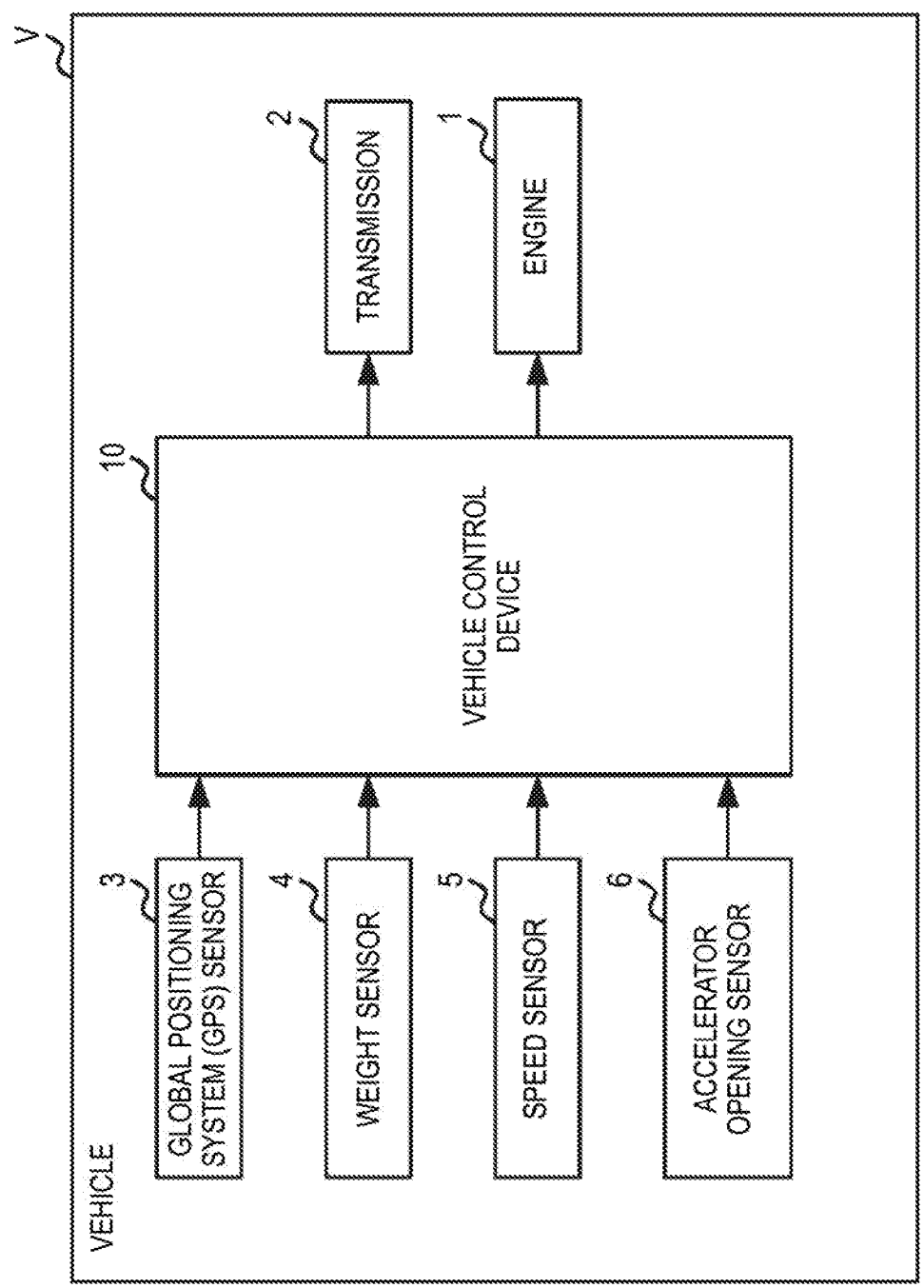

[FIG. 3]
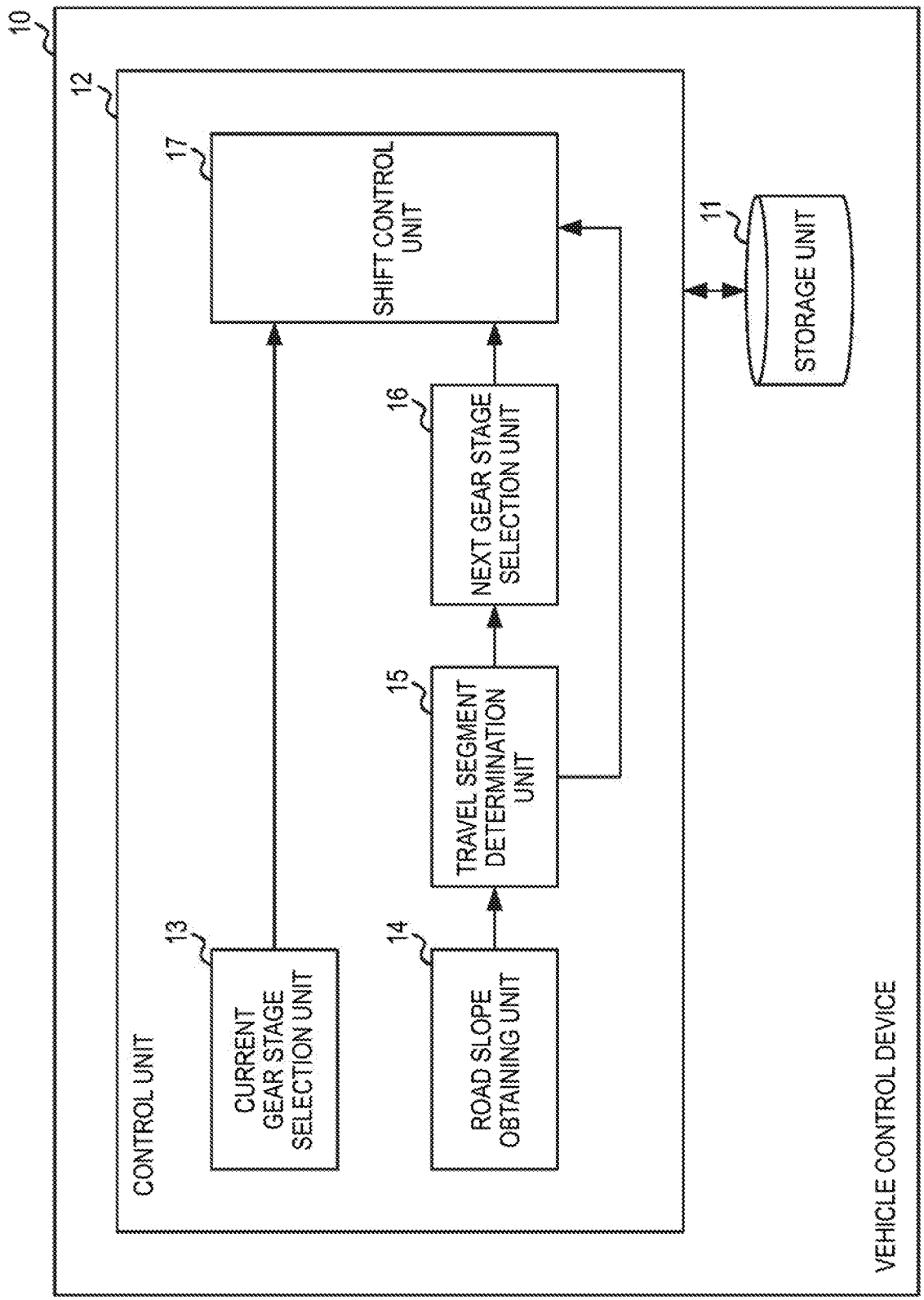

[FIG. 4]
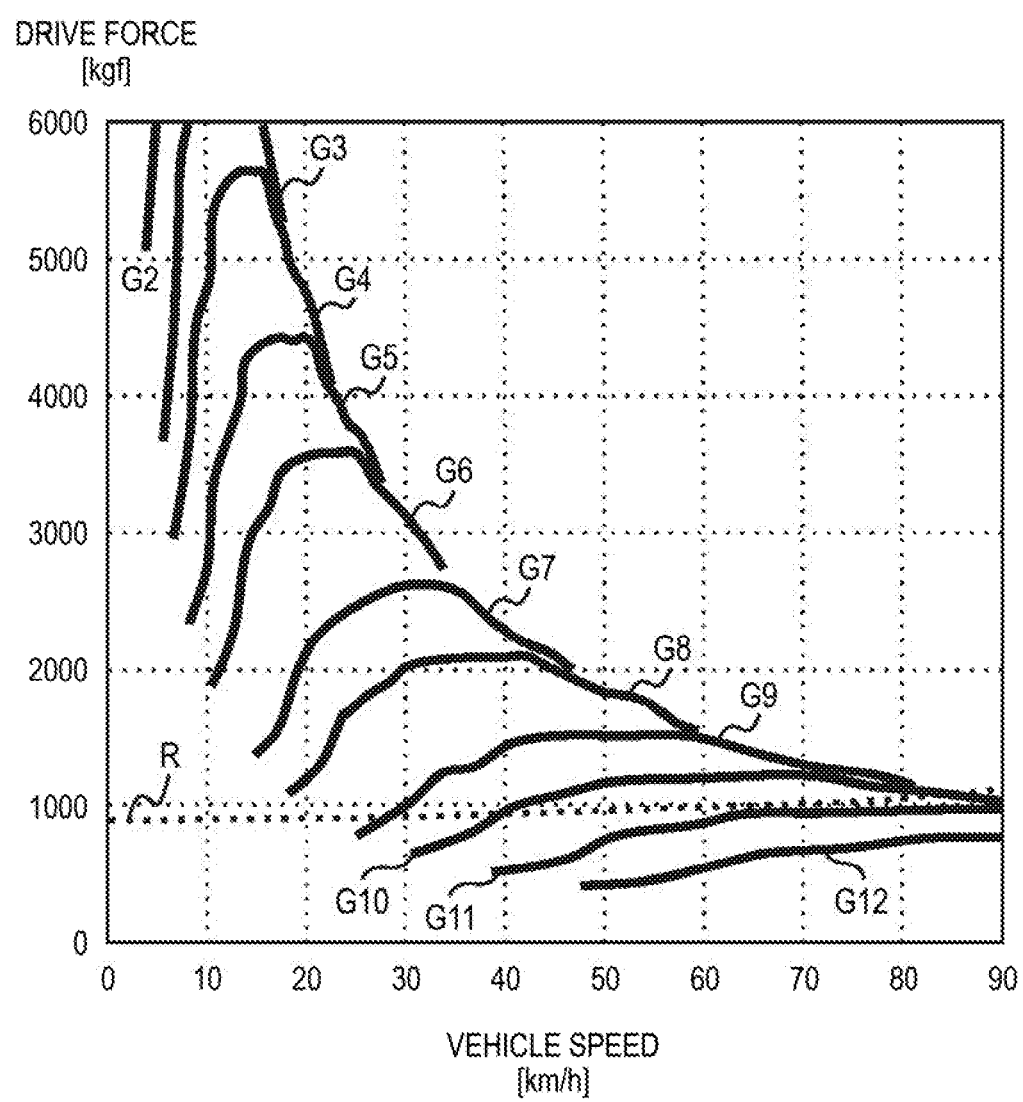

[FIG. 5]
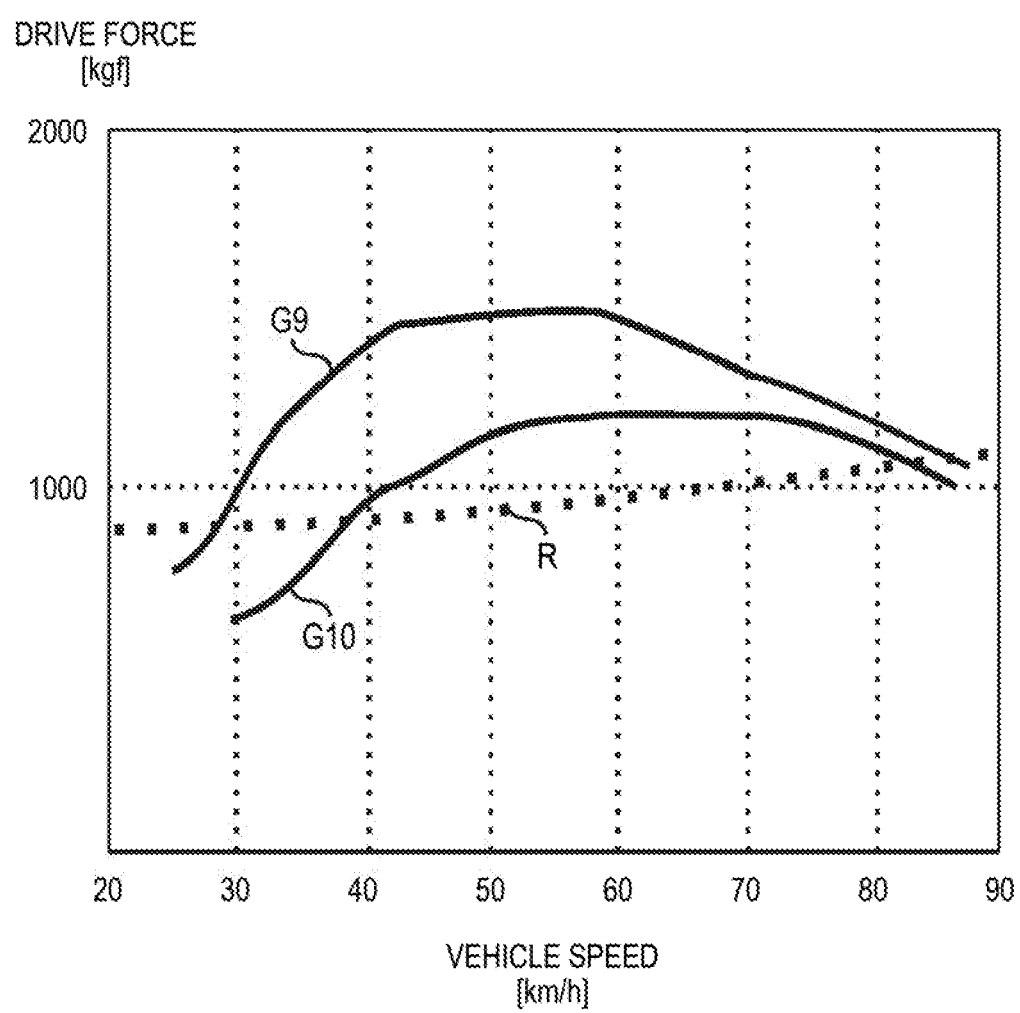

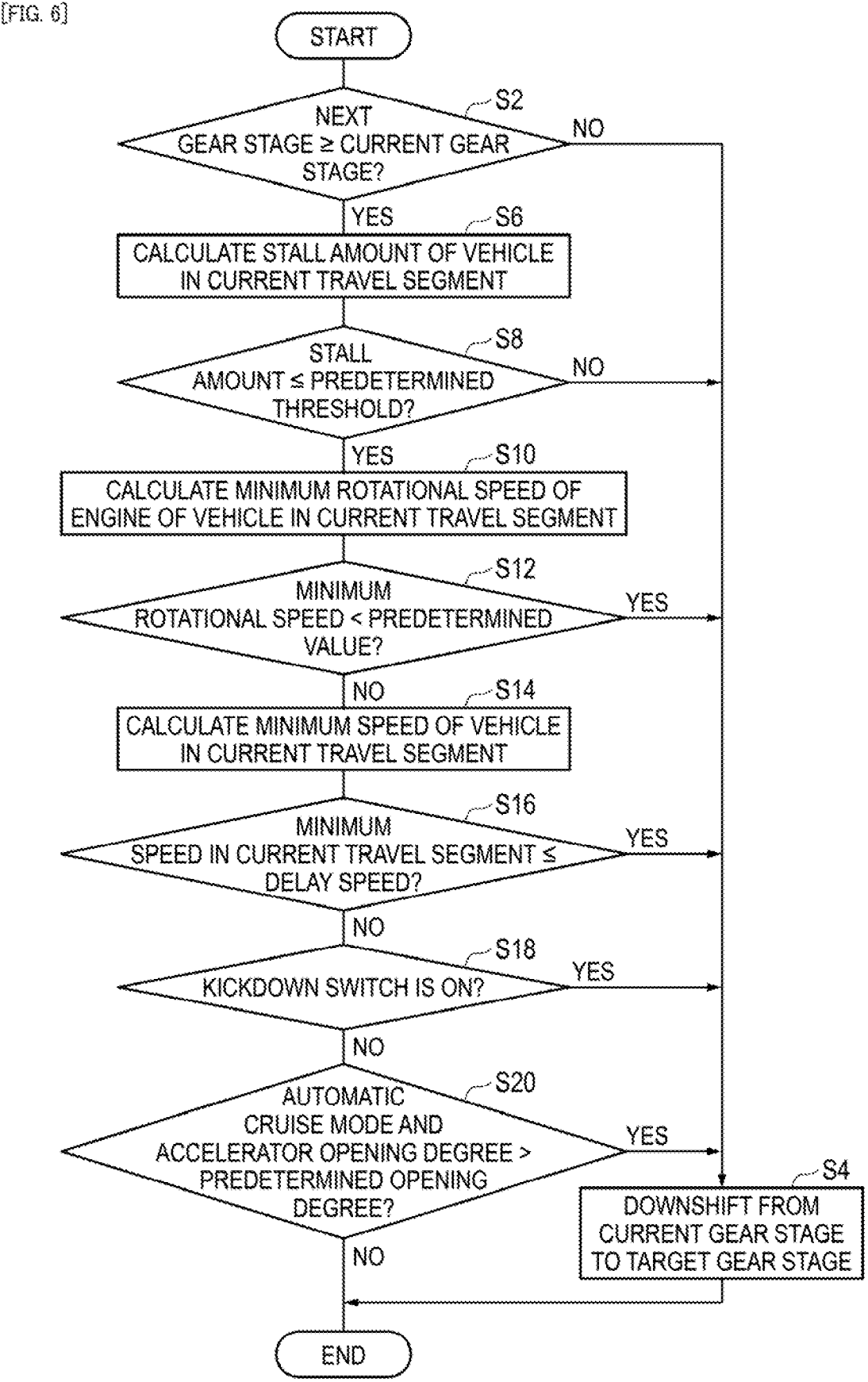
[FIG. 6]

VEHICLE CONTROL DEVICE AND VEHICLE CONTROL METHOD

CROSS-REFERENCE TO RELATED APPLICATIONS

This application is a U.S. National Stage entry of PCT Application No: PCT/JP2018/017923 filed on May 9, 2018, which claims priority to Japanese Patent Application No. 2017-095965, filed May 12, 2017, the contents of which are incorporated herein by reference.

TECHNICAL FIELD

The present disclosure relates to a vehicle control device and a vehicle control method.

BACKGROUND ART

A gear stage of a vehicle is controlled in accordance with a state of a current travel road on which the vehicle is traveling. For example, in a case where the current travel road on which the vehicle is traveling is an uphill road, the gear stage automatically downshifts to a gear stage that is lower than the current gear stage of the vehicle.

However, in a case where the vehicle entered a flat or downhill segment immediately after the vehicle downshifts while traveling on the uphill segment, the upshifting is performed again, and a driver may feel annoyed. For such problems, PTL 1 discloses that, in a case it is determined to perform downshifting in the uphill segment, downshifting is prevented based on a slope status ahead of the vehicle (see, for example, PTL 1).

CITATION LIST

Patent Literature

PTL 1: JP-A-2014-1824

SUMMARY OF INVENTION

Technical Problem

However, by inhibiting the downshifting, an engine rotational speed of the vehicle in the current travel segment may become too low. In this case, a speed of the vehicle may be hardly recovered.

The present disclosure has been made in view of these situations, and an object of the present disclosure is to provide a vehicle control device and a vehicle control method which enable a vehicle to travel in a state where the speed of the vehicle can be quickly recovered.

Solution to Problem

According to a first illustrative aspect of the present disclosure, there may be provided a vehicle control device comprising: a current gear stage selection unit configured to select a current gear stage that is a gear stage of a vehicle in a current travel state of the vehicle based on a travel resistance of the vehicle; a travel segment determination unit configured to determine a next travel segment ahead of the vehicle in a travelling direction, the next travel segment being a travel segment with a road slope different from that of a current travel segment where the vehicle is currently traveling; and a shift control unit configured to control shift of a gear stage, the shift control unit being configured to, in a case the current gear stage selection unit newly selects a target gear stage that is lower than the current gear stage while the vehicle is currently travelling in the current travel segment at the current gear stage, control the shift of the gear stage to maintain the current gear stage with preventing downshifting from the current gear stage to the target gear stage on a condition that the vehicle is able to travel in the next travel segment at the current gear stage since drive force of the vehicle corresponding to the current gear stage exceeds a travel resistance of the vehicle in the next travel segment and that stall amount of the vehicle when the vehicle travels in the current travel segment at the current gear stage is equal to or smaller than a predetermined threshold, wherein even in a state where the downshifting is prevented, in a case a state of the vehicle satisfies a predetermined condition, the shift control unit is configured to control the shift of the gear stage to downshift to the target gear stage without preventing the downshifting.

The shift control unit may be configured to: calculate a minimum engine rotational speed of an engine at the current gear stage in the current travel segment; and in a case the calculated minimum engine rotational speed of the engine at the current gear stage is lower than a predetermined value, control the shift of the gear stage to downshift to the target gear stage without preventing the downshifting.

The vehicle control device may further comprise: a speed sensor configured to measure a speed of the vehicle, wherein the shift control unit may be configured to: calculate a minimum speed of the vehicle in the current travel segment based on a speed of the vehicle measured by the speed sensor and the stall amount of the vehicle in the current travel segment; and in a case the calculated minimum speed is lower than a delay speed, control the shift of the gear stage to downshift to the target gear stage without preventing the downshifting, the delay speed being higher than a minimum speed at which the vehicle is able to travel in the next travel segment among speeds of the vehicle corresponding to the current gear stage.

In a case a kickdown switch is in an on state, the shift control unit may be configured to control the shift of the gear stage to downshift to the target gear stage without preventing the downshifting, the kickdown switch being configured to permit kickdown.

The vehicle control device may further comprise: an opening degree detection unit configured to detect an opening degree of an accelerator, wherein in a case the opening degree detection unit detects that a kickdown switch is in an on state, the shift control unit may be configured to control the shift of the gear stage to downshift to the target gear stage without preventing the downshifting, the kickdown switch being configured to permit kickdown.

The vehicle control device may further comprise: an opening degree detection unit configured to detect an opening degree of an accelerator, wherein in a case the vehicle travels in a constant-speed travel mode, the shift control unit may be configured to control the shift of the gear stage to downshift to the target gear stage without preventing the downshifting on a condition that the opening degree of the accelerator detected by the opening degree detection unit is equal to or greater than a predetermined opening degree.

According to a second illustrative aspect of the present disclosure, there may be provided a vehicle control method for a vehicle comprising a control unit, the method comprising controlling the control unit to perform: a step of selecting a current gear stage that is a gear stage of the vehicle in the current travel state of the vehicle based on a travel resistance of the vehicle; a step of determining an next travel segment ahead of the vehicle in a travel direction, the next travel segment being a travel segment with a road slope different from that of a current travel segment where the vehicle is currently traveling; and a step of controlling shift of a gear stage, the step of controlling the shift comprising, in a case the current gear stage selection unit newly selects a target gear stage that is lower than the current gear stage while the vehicle is currently travelling in the current travel segment at the current gear stage, controlling the shift of the gear stage to maintain the current gear stage with preventing downshifting from the current gear stage to the target gear stage on a condition that the vehicle is able to travel in the next travel segment at the current gear stage since drive force of the vehicle corresponding to the current gear stage exceeds a travel resistance of the vehicle in the next travel segment and that stall amount of the vehicle when the vehicle travels in the current travel segment at the current gear stage is equal to or smaller than a predetermined threshold, wherein even in a state where the downshifting is prevented, in a case where a state of the vehicle satisfies a predetermined condition, the step of controlling the shift comprises controlling the shift of the gear stage to downshift to the target gear stage without preventing the downshifting.

Advantageous Effects of Invention

According to the present disclosure, the vehicle is able to travel in a state where the speed of the vehicle can be quickly recovered.

BRIEF DESCRIPTION OF DRAWINGS

FIG. 1 is a diagram showing an outline of a vehicle according to an illustrative embodiment.
FIG. 2 is a diagram schematically showing an internal configuration of the vehicle according to the illustrative embodiment.
FIG. 3 is a diagram showing a configuration of a vehicle control device according to the illustrative embodiment.
FIG. 4 is a travel performance diagram of the vehicle according to the illustrative embodiment.
FIG. 5 is a diagram showing a part of the travel performance diagram shown in FIG. 4.
FIG. 6 is a flowchart illustrating a flow of a processing of downshift control that is executed by a vehicle control device according to the illustrative embodiment.

DESCRIPTION OF EMBODIMENTS

[Outline of Vehicle According to Illustrative Embodiment]

An outline of a vehicle V according to an illustrative embodiment will be described with reference to FIG. 1.
FIG. 1 is a diagram showing an outline of a vehicle according to an illustrative embodiment.
The vehicle V selects the gear stage of the vehicle V in a current travel state of itself (hereinafter referred to as the current travel state). The vehicle V may select a gear stage lower than the current gear stage based on the travel resistance of the vehicle V in a case where a current travel segment is an uphill segment as shown in FIG. 1. In this case, the vehicle V controls the shift so as to downshift from the current gear stage to the selected gear stage.
The vehicle V according to the illustrative embodiment determines the next travel segment ahead of the vehicle V in a travel direction. In a case where the stall amount of the vehicle V in the current travel segment is low and the vehicle V is able to travel with the current gear stage in the next travel segment at a predetermined speed or higher, the vehicle V performs downshifting prevention control, as an exception of shift control in a case where the selected gear stage is lower than the current gear stage. Further, in a case where the downshifting prevention control is performed, when the state of the vehicle V satisfies a predetermined condition, the vehicle V performs shift of the gear stage to downshift to the selected gear stage without preventing the downshifting. In this way, the vehicle speed of the vehicle V can be quickly recovered. Hereinafter, the vehicle V will be described in detail.

[Configuration of Vehicle According to Illustrative Embodiment]

A configuration of the vehicle V according to the illustrative embodiment will be described with reference to FIG. 2.
FIG. 2 is a diagram schematically showing an internal configuration of the vehicle V according to the illustrative embodiment. The vehicle V according to the illustrative embodiment includes an engine 1, a transmission 2, a global positioning system (GPS) sensor 3, a weight sensor 4, a speed sensor 5, an accelerator opening sensor 6, and the vehicle control device 10 (e.g., an electronic control unit (ECU)).
The vehicle V is a large vehicle which uses the engine 1, such as a diesel engine, as a drive force and specifically, is a vehicle having an auto cruise mode. The transmission 2 transmits rotational drive force of the engine 1 to a drive wheel (not shown) of the vehicle V. The transmission 2 includes a plurality of stages of gears for converting the rotational drive force of the engine 1.
Here, the "automatic cruise mode" in the vehicle V refers to a mode in which the engine 1, the transmission 2, and the like are automatically controlled by the vehicle control device 10 so as to maintain a speed of the vehicle V set in advance even if the driver does not operate an accelerator or a shift lever. It is mainly assumed that the auto cruise mode is used when the vehicle V travels on a highway.
The vehicle V travels in either mode of an economy mode as a first mode and a power mode as a second mode. The economy mode is a mode in which fuel consumption amount of the vehicle V is reduced preferentially during travel. The power mode is a mode in which travel performances of the vehicle V are improved preferentially during travel.
The GPS sensor 3 receives and analyzes radio waves transmitted from a plurality of navigation satellites, so as to obtain a position of the GPS sensor 3, that is, a position of the vehicle V on which the GPS sensor 3 is mounted. The GPS sensor 3 outputs information indicating the position of the vehicle V to the vehicle control device 10.
The weight sensor 4 obtains total weight of the vehicle V. Specifically, the weight sensor 4 obtains the total weight of the vehicle V by measuring weight of a load of the vehicle V and by adding up the weight of the load and weight of the vehicle V alone excluding the load. The weight sensor 4 outputs information indicating the total weight of the vehicle V to the vehicle control device 10.
The speed sensor 5 measures the speed of the vehicle V. The speed sensor 5 outputs information indicating the measured speed of the vehicle V to the vehicle control device 10. The accelerator opening sensor 6 measures an accelerator opening degree that is a press-down amount of a pedal of an accelerator by a driver of the vehicle V. The accelerator opening sensor 6 outputs information indicating the accelerator opening degree to the vehicle control device 10.

The vehicle control device 10 obtains information from each of the sensors described above, and controls, based on the obtained information, the amount of fuels to be supplied to a cylinder in the engine 1 and to the gear stages of the transmission 2. In a case where the vehicle V is in the automatic cruise mode, the vehicle control device 10 controls the engine 1 and the transmission 2 such that the vehicle V travels at a set speed. In addition, in a case where a speed limit device (SLD) of the vehicle V is operating, the vehicle control device 10 controls the engine 1 and the transmission 2 such that the speed of the vehicle V does not exceed the set maximum speed.

In a case where the vehicle V is in the economy mode, the vehicle control device 10 controls the engine 1 and the transmission 2 with priority given to save the fuel consumption amount. In a case where the vehicle V is in the power mode, the vehicle control device 10 controls the engine 1 and the transmission 2 with priority given to an improvement in travel performances of the vehicle V.

[Configuration of Vehicle Control Device 10 According to Illustrative Embodiment]

Next, a configuration of the vehicle control device 10 according to the illustrative embodiment will be described with reference to FIG. 3.

FIG. 3 is a diagram showing a configuration of the vehicle control device 10 according to the illustrative embodiment. The vehicle control device 10 according to the illustrative embodiment includes a storage unit 11 and a control unit 12.

The storage unit 11 is, for example, a read only memory (ROM) or a random access memory (RAM). The storage unit 11 stores various programs for causing the control unit 12 to perform operations.

The control unit 12 is a computational resource including a processor such as a central processing unit (CPU) (not shown). The control unit 12 functions as a current gear stage selection unit 13, a road slope obtaining unit 14, a travel segment determination unit 15, a next gear stage selection unit 16, and a shift control unit 17 by executing a program stored in the storage unit 11.

The current gear stage selection unit 13 calculates a net average effective pressure PmeR of the engine 1 corresponding to a travel resistance of the vehicle V in the current travel state every predetermined time, and calculates a net average effective pressure Pme of each gear stage based on the calculated net average effective pressure PmeR. The net average effective pressure Pme of each gear stage is minimum torque required for maintaining the current travel state. The current gear stage selection unit 13 selects the current gear stage, which is a gear stage of the transmission 2 in the current travel state of the vehicle V, by using the calculated net average effective pressure Pme of each gear stage and an engine rotational speed in a case of shifting to each gear stage and by referring to an iso-fuel consumption map and a maximum torque map PmeMAX.

Specifically, first, the current gear stage selection unit 13 calculates the net average effective pressure PmeR of the engine 1 corresponding to the travel resistance in the current travel state. The current gear stage selection unit 13 calculates the net average effective pressure Pme of the engine 1 from torque generated by the engine 1. The current gear stage selection unit 13 calculates the net average effective pressure PmeR corresponding to the travel resistance of the engine 1 from the calculated net average effective pressure Pme, vehicle weight, a gear ratio of the gear stage selected by the transmission 2, a final deceleration ratio, transmission efficiency, the engine exhaust amount, a wheel radius, and acceleration of the vehicle V. The current gear stage selection unit 13 calculates in each gear stage the net average effective pressure Pme, which is the minimum torque required for maintaining the current travel state, and the engine rotational speed based on the calculated net average effective pressure PmeR, and creates an iso-horsepower diagram. The current gear stage selection unit 13 selects a gear stage having the best fuel efficiency by referring to the iso-horsepower diagram, the maximum torque map PmeMAX, and the iso-fuel consumption map. Incidentally, the current gear stage selection unit 13 may calculate the net average effective pressure PmeR corresponding to the travel resistance based on a road slope on the road on which the vehicle V is currently traveling, which is obtained by the road slope obtaining unit 14.

The road slope obtaining unit 14 obtains the road slope on the road on which the vehicle V is currently traveling, based on the information indicating the position of the vehicle V obtained from the GPS sensor 3 and map information stored in the storage unit 11. For example, the road slope obtaining unit 14 obtains the road slope from the position of the vehicle V to a position ahead by a predetermined distance (for example, 500 m).

On the basis of the road slope obtained by the road slope obtaining unit 14, the travel segment determination unit 15 determines a next travel segment ahead of the vehicle V in the travel direction which is a travel segment with a road slope different from a current travel segment in which the vehicle V is traveling.

On the basis of the road slope of the next travel segment, the next gear stage selection unit 16 selects the next gear stage, which is a gear stage of the transmission 2 in the next travel segment. Specifically, first, the next gear stage selection unit 16 calculates the travel resistance of the next travel segment based on rolling resistance of the drive wheel of the vehicle V, air resistance of the vehicle V, and slope resistance of the next travel segment.

Subsequently, the next gear stage selection unit 16 specifies the next gear stage based on: drive force characteristic information indicating a relationship between the speed and the drive force of the vehicle V of each of the plurality of gear stages of the vehicle V stored in the storage unit 11; and the calculated travel resistance of the next travel segment.

FIG. 4 is a travel performance diagram of the vehicle V corresponding to the drive force characteristic information according to the illustrative embodiment. FIG. 4 shows drive force characteristics G2 to G12 indicating the relationship between the drive force of the vehicle V and the speed in each of second to twelfth stages as the plurality of gear stages. FIG. 4 further shows a travel resistance characteristic R indicating the relationship between the speed of the vehicle V and the travel resistance corresponding to the next travel segment. FIG. 5 is a diagram showing a part of the travel performance diagram shown in FIG. 4. FIG. 5 shows drive force characteristics G9 and G10 of the ninth and tenth stages and the travel resistance characteristic R corresponding to the next travel segment.

The next gear stage selection unit 16 selects a gear stage in which the drive force of the vehicle V becomes greater than the travel resistance of the vehicle V in the next travel segment as the next gear stage, based on the drive force characteristics respectively corresponding the plurality of gear stages.

The next gear stage selection unit 16 selects the gear stages in different manners in cases where the travel mode of the vehicle V is the economy mode and the power mode. First, a selection example of the gear stage in the case of the economy mode will be described.

In the case where the travel mode of the vehicle V is the economy mode, for each of the plurality of gear stages at which the vehicle can travel in the next travel segment, the next gear stage selection unit 16 specifies a minimum travelable vehicle speed, which is the minimum speed among the speed at which the vehicle V can travel.

Specifically, for the drive force characteristic of each of the plurality of gear stages, the next gear stage selection unit 16 specifies a minimum speed among the speed of the vehicle V, at which the drive force indicated by the drive force characteristic is equal to or greater than the travel resistance indicated by the travel resistance characteristic corresponding to the next travel segment, as the minimum travelable vehicle speed. The next gear stage selection unit 16 specifies a lower speed, from among the speeds at which the drive force indicated by the drive force characteristic and the travel resistance indicated by the travel resistance characteristic coincide with each other, as the minimum travelable vehicle speed. In a case where the drive force exceeds the travel resistance at each speed and thus the drive force and the travel resistance do not coincide with each other, the next gear stage selection unit 16 specifies a minimum speed of the vehicle V indicated by the drive force characteristic as the minimum travelable vehicle speed. In the example shown in FIG. 5, for the eighth stage, the next gear stage selection unit 16 specifies the minimum travelable vehicle speed as 18 km/h.

The next gear stage selection unit 16 selects a gear stage having the highest minimum travelable vehicle speed and a low drive force characteristic (a highest travelable gear stage) among the plurality of gear stages, as the next gear stage. Thereby, the next gear stage selection unit 16 can select the highest travelable gear stage in the economy mode.

For example, the next gear stage selection unit 16 selects the tenth and lower stages as a gear stage at which the vehicle can travel in the next travel segment. For the ninth stage, the next gear stage selection unit 16 specifies a minimum speed among the speed of the vehicle V, at which the drive force indicated by the drive force characteristic and the travel characteristic indicated by the travel resistance characteristic R corresponding to the next travel segment coincide with each other, as the minimum travelable vehicle speed. In the example shown in FIG. 5, the next gear stage selection unit 16 specifies the minimum travelable vehicle speed as 28 km/h. Similarly, for the tenth stage, the next gear stage selection unit 16 specifies the minimum travelable vehicle speed as 40 km/h. The next gear stage selection unit 16 selects a gear stage having the highest speed among the minimum travelable vehicle speed specified for the gear stages including the tenth and lower stages and a low drive force characteristic, that is, the tenth stage, as the next gear stage.

In the case where the travel mode of the vehicle V is the power mode, for each of the plurality of gear stages at which the vehicle can travel in the next travel segment, the next gear stage selection unit 16 specifies a maximum travelable vehicle speed, which is the maximum speed among the speed at which the vehicle V can travel.

Specifically, in the case of power mode, for the drive force characteristic of each of the plurality of gear stages, the next gear stage selection unit 16 specifies the maximum speed among the speed of the vehicle V, at which the drive force indicated by the drive force characteristic is equal to or greater than the travel characteristic indicated by the travel resistance characteristic corresponding to the next travel segment, as the maximum travelable vehicle speed. The next gear stage selection unit 16 specifies the highest speed among the speed, at which the drive force indicated by the drive force characteristic and the travel resistance indicated by the travel resistance characteristic coincide with each other, as the maximum travelable vehicle speed. In a case where the drive force exceeds the travel resistance at each speed and thus the drive force and the travel resistance do not coincide with each other, the next gear stage selection unit 16 specifies the maximum speed of the vehicle V indicated by the drive force characteristic as the maximum travelable vehicle speed. For example, for the eighth stage, the next gear stage selection unit 16 specifies the maximum travelable vehicle speed as 59 km/h.

The next gear stage selection unit 16 selects a gear stage having the highest maximum travelable vehicle speed and a high drive force characteristic (a highest-speed travelable gear stage) among the plurality of gear stages, as the next gear stage. As a result, the next gear stage selection unit 16 can select the highest-speed travelable gear stage in the power mode.

For example, the next gear stage selection unit 16 selects the tenth and lower stages as a travelable gear stage. For the ninth stage, the next gear stage selection unit 16 specifies a higher speed among the speed of the vehicle V, at which the drive force indicated by the drive force characteristic and the travel characteristic indicated by the travel resistance characteristic R corresponding to the next travel segment coincide with each other, as the maximum travelable vehicle speed. In the example shown in FIG. 5, the next gear stage selection unit 16 specifies the maximum travelable vehicle speed as 87 km/h. Similarly, for the tenth stage, the next gear stage selection unit 16 specifies the maximum travelable vehicle speed as 82 km/h. The next gear stage selection unit 16 selects a gear stage having the highest speed among the maximum travelable vehicle speed specified for the gear stages including the tenth and lower stages and a high drive force characteristic, that is, the ninth stage, as the next gear stage.

The shift control unit 17 calculates the speed at the time of entering the next travel segment and the travel resistance of the vehicle V in the next travel segment. In order to calculate the speed at the time of entering the next travel segment, the shift control unit 17 specifies the drive force of the vehicle V at the current speed by referring to the drive force characteristic information of the vehicle V stored in the storage unit 11. Further, the shift control unit 17 calculates the travel resistance at the current speed in the current travel segment. The shift control unit 17 calculates the acceleration of the vehicle V based on a difference between the specified drive force and the travel resistance, and the total weight of the vehicle V obtained by the weight sensor 4. Here, in a case where the travel resistance exceeds the drive force of the vehicle V, the acceleration of the vehicle V becomes a negative value. The shift control unit 17 calculates a change amount of the speed of the vehicle V from the current position of the vehicle V to the start position of the next travel segment based on the calculated acceleration of the vehicle V and a remaining distance of the current travel segment. In the illustrative embodiment, since the current travel segment is assumed as an uphill segment, the stall amount of the vehicle V is calculated. The shift control unit 17 subtracts the stall amount from the current speed of the vehicle V to calculate the speed of the vehicle V at the time of entering the next travel segment.

The shift control unit 17 estimates the travel resistance of the vehicle V in the next travel segment based on the road slope in the next travel segment. The shift control unit 17 calculates the travel resistance characteristic of the next travel segment based on the rolling resistance of the drive wheel of the vehicle V, the air resistance of the vehicle V, and the slope resistance of the next travel segment.

[Shift Control Based on Current Gear Stage Selected by Current Gear Stage Selection Unit 13]

The shift control unit 17 controls shift of the gear stage of the vehicle V in the current travel segment based on the current gear stage selected by the current gear stage selection unit 13. For example, in a case where the current gear stage selection unit 13 newly selects a target gear stage lower than the current gear stage while the vehicle is currently traveling in the current travel segment at the current gear stage, the shift control unit 17 determines whether the vehicle V can travel in the next travel segment at the current gear stage. Specifically, the shift control unit 17 determines whether the vehicle V can travel in the next travel segment at the current gear stage based on whether a maximum value of the drive force corresponding to the current gear stage exceeds the travel resistance in the next travel segment.

Further, in a case where the vehicle V travels in the current travel segment at the current gear stage, the shift control unit 17 calculates the stall amount of the vehicle V. Then, the shift control unit 17 determines whether the calculated stall amount is equal to or smaller than a predetermined threshold. Here, the predetermined threshold is a value set based on the current speed of the vehicle V. In a case where the vehicle can travel in the next travel segment at the current gear stage and the calculated stall amount is equal to or smaller than the predetermined threshold, the shift control unit 17 controls shift of the gear stage of the transmission 2 to prevent downshifting from the current gear stage to the target gear stage and to maintain the current gear stage. In a case where the vehicle is unable to travel in the next travel segment at the current gear stage or in a case where the calculated stall amount is greater than the predetermined threshold, the shift control unit 17 controls shift of the gear stage of the transmission 2 to downshift from the current gear stage to the target gear stage.

[Exception of Downshifting Prevention]

The shift control unit 17 performs control related to exception of the downshifting prevention control. In a case where the state of the vehicle V satisfies a predetermined condition, even in a state in which downshifting is prevented, the shift control unit 17 controls shift of the gear stage of the transmission 2 to downshift to the target gear stage without preventing downshifting. Next, the exception of downshifting prevention will be described in detail.

[Exception of Downshifting Prevention 1]

The shift control unit 17 calculates a rotational speed of the engine 1 that is the lowest in the case where the vehicle V travels in the current travel segment at the current gear stage. Here, the speed at the time of entering the next travel segment of the vehicle V is the minimum speed of the vehicle V in the current travel segment. The shift control unit 17 calculates a rotational speed of the engine 1 that is the lowest in the case where the vehicle V travels in the current travel segment at the current gear stage based on the minimum speed of the vehicle V in the current travel segment. In a case where the calculated rotational speed is lower than the predetermined value, the shift control unit 17 controls shift of the gear stage of the transmission 2 to downshift to the target gear stage without preventing downshifting. In this way, the vehicle control device 10 can prevent the driver from feeling uncomfortable if the gear stage is not changed even though the rotational speed of the engine 1 is excessively low in the current travel segment.

[Exception of Downshifting Prevention 2]

The shift control unit 17 calculates the minimum speed of the vehicle V in the current travel segment based on the speed of the vehicle V and the stall amount of the vehicle V in the current travel segment. Then, in a case where the minimum speed is lower than a delay speed, which is higher than the minimum speed at which the vehicle V can travel in the next travel segment among the speed of the vehicle V corresponding to the current gear stage, the shift control unit 17 controls shift of the gear stage so as to downshift to the target gear stage without preventing downshifting.

Hereinafter, an example in which the shift control unit 17 performs control without performing downshifting based on the minimum speed of the vehicle V in the current travel segment and the delay speed will be described. First, the shift control unit 17 calculates the minimum speed of the vehicle V in the current travel segment. Here, the minimum speed of the vehicle V is the speed at the time of entering the next travel segment. Therefore, the shift control unit 17 sets the calculated speed of the vehicle V at the time of entering the next travel segment as the minimum speed of the vehicle V in the current travel segment.

The shift control unit 17 specifies the minimum speed at which the vehicle V can travel in the next travel segment among the speed of the vehicle V corresponding to the current gear stage. Specifically, the shift control unit 17 specifies the minimum speed of the vehicle V at which the vehicle V can travel at the current gear stage, based on: the travel performance characteristic indicating the relationship between the speed and the drive force of the vehicle V corresponding to the current gear stage indicated by the drive force characteristic information of the vehicle V; and the calculated travel resistance of the next travel segment. Here, the minimum speed is the lowest speed among the speed at which the drive force in the current gear stage and the travel resistance in the next travel segment are equal.

The shift control unit 17 calculates the delay speed that is higher than the minimum speed of the vehicle V, at which the vehicle V can travel at the current gear stage, by a predetermined speed. Here, the predetermined speed is, for example, 5% higher than the minimum speed. In a case where the minimum speed of the vehicle V in the current travel segment is lower than the delay speed, the shift control unit 17 controls shift of the gear stage to downshift to the target gear stage without preventing downshifting. In this way, the vehicle control device 10 can prevent failure of maintaining travelling at the current gear stage due to the lowering of the speed more than expected amount in the next travel segment.

[Exception of Downshifting Prevention 3]

In a case where the vehicle is traveling with a kickdown switch that permits kickdown in an ON state, the shift control unit 17 controls shift of the gear stage of the transmission 2 to downshift from the current gear stage to the target gear stage without preventing downshifting. Incidentally, the shift control unit 17 may determine that the kickdown switch is on when the accelerator opening degree detected by the accelerator opening sensor 6 is equal to or greater than a predetermined opening degree (for example, 80% of the maximum opening degree). Further, when the vehicle V is traveling in the automatic cruise mode, in a case the accelerator opening degree detected by the accelerator opening degree sensor 6 is equal to or greater than a predetermined opening degree, the shift control unit 17 controls shift of the gear stage of the transmission 2 to downshift from the current gear stage to the target gear stage without preventing downshifting. Here, the predetermined opening degree is, for example, an opening degree of 80% of a maximum opening degree. In this way, the vehicle control device 10 can downshift while prioritizing an intention of the driver of the vehicle V to press down the accelerator and cause the vehicle V to accelerate.

Incidentally, the shift control unit 17 may control shift of the gear stage of the transmission 2 to downshift from the current gear state to the target gear state when it is detected that the opening degree of the accelerator detected by the accelerator opening degree sensor 6 changes from an opening degree smaller than a first opening degree to an opening degree larger than a second opening degree within a predetermined time (for example, 3 seconds). Here, the first opening degree is, for example, an opening degree of 10% of the maximum opening degree, and the second opening degree is, for example, 80% of the maximum opening degree.

[Exception of Downshifting Prevention 4]

In a case where the next gear stage selected by the next gear stage selection unit 16 is lower than the current gear stage, the shift control unit 17 controls shift of the gear stage of the transmission 2 to downshift from the current gear stage to the target gear stage without preventing the downshifting.

[Processing Flow of Early Downshifting Control]

Next, a processing flow of downshifting control according to an illustrative embodiment will be described. FIG. 6 is a flowchart for showing the flow of the processing related to downshifting control that is executed by the vehicle control device 10 according to the illustrative embodiment. The processing in the present flowchart is started when the current gear stage selection unit 13 newly selects the target gear stage lower than the current gear stage.

The shift control unit 17 determines whether the next gear stage selected by the next gear stage selection unit 16 is equal to or higher than the current gear stage (S2). In a case where the next gear stage is equal to or higher than the current gear stage (YES in S2), the shift control unit 17 causes the processing to proceed to S6. In a case where the next gear stage is lower than the current gear stage (NO in S2), the shift control unit 17 causes the processing to proceed to the S4 and controls shift of the gear stage of the transmission 2 to downshift from the current gear stage to the target gear stage.

The shift control unit 17 calculates the stall amount of the vehicle V in the current travel segment (S6). The shift control unit 17 determines whether the calculated stall amount is equal to or smaller than a predetermined threshold (S8). In a case the calculated stall amount is greater than the predetermined threshold (NO in S8), the shift control unit 17 controls shift of the gear stage of the transmission 2 to downshift from the current gear stage to the target gear stage (S4). In a case the calculated stall amount is equal to or smaller than the predetermined threshold (YES in S8), the shift control unit 17 causes the processing to proceed to S10.

The shift control unit 17 calculates the minimum rotational speed of the engine 1 of the vehicle V in the current travel segment (S10). The shift control unit 17 determines whether the calculated minimum rotational speed of the engine 1 is less than a predetermined value (S12). In a case the calculated minimum rotational speed is less than the predetermined value (YES in S12), the shift control unit 17 causes the processing to proceed to S4 and controls shift of the gear stage of the transmission 2 to downshift from the current gear stage to the target gear stage. In a case the calculated minimum rotational speed is equal to or greater than the predetermined value (NO in S12), the shift control unit 17 causes the processing to proceed to S14.

First, the shift control unit 17 calculates the minimum speed of the vehicle V in the current travel segment (S14). The shift control unit 17 determines whether the minimum speed of the vehicle V in the current travel segment is equal to or smaller than the delay speed (S16). In a case where the minimum speed of the vehicle V in the current travel segment is equal to or smaller than the delay speed (YES in S16), the shift control unit 17 causes the processing to proceed to S4. That is, the shift control unit 17 controls shift of the gear stage of the transmission 2 to downshift from the current gear stage to the target gear stage without performing downshifting prevention.

In a case where the minimum speed of the vehicle V in the current travel segment is greater than the delay speed (NO in S16), the shift control unit 17 determines whether the kickdown switch is ON (S18). In a case where the kickdown switch is ON (YES in S18), the shift control unit 17 causes the processing to proceed to S4. That is, the shift control unit 17 controls shift of the gear stage of the transmission 2 to perform downshifting. In a case where the kickdown switch is OFF (NO in S18), the shift control unit 17 causes the processing to proceed to S20.

The shift control unit 17 determines whether the vehicle V is in the automatic cruise mode and the accelerator opening degree detected by the accelerator opening degree sensor 6 is greater than the predetermined opening degree (S20). In a case where the vehicle is in the automatic cruise mode and the accelerator opening degree is greater than the predetermined opening degree (YES in S20), the shift control unit 17 causes the processing to proceed to S4. That is, the shift control unit 17 controls shift of the gear stage of the transmission 2 to downshift from the current gear stage to the target gear stage without performing the downshifting prevention.

In a case where the vehicle V is not in the automatic cruise mode or in a case where the opening degree of the accelerator is equal to or smaller than the predetermined opening degree (NO in S20), the shift control unit 17 ends the process of this flowchart. That is, the shift control unit 17 controls shift of the gear stage of the transmission 2 to perform the downshifting prevention.

Effects of the Present Illustrative Embodiment

As described above, even in a state in which downshifting is prevented, in a case where the state of the vehicle V satisfies the predetermined condition, the vehicle control device 10 according to the present illustrative embodiment controls shift of the gear stage to downshift from the current gear stage to the target gear stage without preventing downshifting. In this way, the vehicle control device 10 can cause the vehicle V to travel in a state in which the speed of the vehicle V can be recovered quickly. In addition, in a case where the predetermined condition is not satisfied, the vehicle control device 10 prevents downshifting, so that the number of gear shift can be reduced and the fuel consumption can be improved.

Further, the next gear stage selecting unit 16 of the vehicle control device 10 selects the gear stage in different manners in the economy mode and in the power mode, and thus can select the gear stages suitable for the economy mode and the power mode. As a result, in the power mode, a situation in which the vehicle V selects a lower gear as the next gear increases as compared with a case where the vehicle V is traveling in the economy mode, and thus the frequency of the downshifting prevention is reduced. As a result, in the vehicle V, the number of times that the condition for preventing downshifting is satisfied is reduced, and downshifting is performed. As a result, the vehicle V can travel with importance on the travel performance. In addition, in the economy mode, since a situation in which a high gear is selected increases, the frequency of downshifting prevention increases, and the vehicle V can travel with an emphasis on the fuel consumption.

The present disclosure have been described using the illustrative embodiment, but the technical scope of the present disclosure is not limited to the above-described illustrative embodiment and various modifications and changes can be made within the scope of the present disclosure. For example, the specific illustrative embodiment of the dispersion and integration of the device is not limited to the above illustrative embodiment, and all or a part of the illustrative embodiment may be functionally or physically distributed and integrated in optional units. In addition, new illustrative embodiments generated by any combination of a plurality of illustrative embodiments are also contained in the illustrative embodiment of the present disclosure. The effect of the new illustrative embodiment caused by the combination has the effect of the original illustrative embodiment.

The present application is based on the Japanese Patent Application (Japanese Patent Application No. 2017-095965) filed on May 12, 2017, contents of which are incorporated herein as reference.

INDUSTRIAL APPLICABILITY

The present invention has the effect of causing a vehicle to travel in a state where the speed of the vehicle can be quickly recovered, and is useful for a vehicle control device and a vehicle control method.

REFERENCE SIGNS LIST

1: Engine
2: Transmission
3: GPS sensor
4: Weight sensor
5: Speed sensor
6: Accelerator opening degree sensor
10: Vehicle control device
11: Storage unit
12: Control unit
13: Current gear stage selection unit
14: Road slope obtaining unit
15: Travel segment determination unit
16: Next gear stage selection unit
17: Shift control unit
V: Vehicle

The invention claimed is:

1. A vehicle control device comprising an electronic control unit configured to:
select a current gear stage that is a gear stage of a vehicle in a current travel state of the vehicle based on a travel resistance of the vehicle;
determine a next travel segment ahead of the vehicle in a travelling direction, the next travel segment being a travel segment with a road slope different from that of a current travel segment where the vehicle is currently traveling; and
control a shift of the gear stage, the controlling of the shift of the gear stage comprising, when the selecting of the current gear stage newly selects a target gear stage that is lower than the current gear stage while the vehicle is currently travelling in the current travel segment at the current gear stage, control the shift of the gear stage to maintain the current gear stage and prevent downshifting from the current gear stage to the target gear stage, on a condition that the vehicle is able to travel in the next travel segment at the current gear stage since drive force of the vehicle corresponding to the current gear stage exceeds a travel resistance of the vehicle in the next travel segment and that a stall amount of the vehicle when the vehicle travels in the current travel segment at the current gear stage is equal to or smaller than a predetermined threshold,
wherein in the controlling of the shift of the gear stage, in a state where the downshifting is prevented, when a state of the vehicle satisfies a predetermined condition, the electronic control unit is configured to control the shift of the gear stage to downshift to the target gear stage without preventing the downshifting.

2. The vehicle control device according to claim 1, wherein in the controlling of the shift of the gear stage, the electronic control unit is configured to:
calculate a minimum engine rotational speed of an engine at the current gear stage in the current travel segment; and
when the calculated minimum engine rotational speed of the engine at the current gear stage is lower than a predetermined value, control the shift of the gear stage to downshift to the target gear stage without preventing the downshifting.

3. The vehicle control device according to claim 1, further comprising:
a speed sensor configured to measure a speed of the vehicle,
wherein in the controlling of the shift of the gear stage, the electronic control unit is configured to:
calculate a minimum speed of the vehicle in the current travel segment based on a speed of the vehicle measured by the speed sensor and the stall amount of the vehicle in the current travel segment; and
when the calculated minimum speed is lower than a delay speed, control the shift of the gear stage to downshift to the target gear stage without preventing the downshifting, the delay speed being higher than a minimum speed at which the vehicle is able to travel in the next travel segment among speeds of the vehicle corresponding to the current gear stage.

4. The vehicle control device according to claim 1, wherein when a kickdown switch is in an on state, in the controlling of the shift of the gear stage, the electronic control unit is configured to control the shift of the gear stage to downshift to the target gear stage without preventing the downshifting, the kickdown switch being configured to permit kickdown.

5. The vehicle control device according to claim 1, further comprising:
an opening degree detector configured to detect an opening degree of an accelerator,
wherein when the opening degree detector detects that a kickdown switch is in an on state, in the controlling of the shift of the gear stage, the electronic control unit is configured to control the shift of the gear stage to downshift to the target gear stage without preventing the downshifting, the kickdown switch being configured to permit kickdown.

6. The vehicle control device according to claim 1, further comprising:
an opening degree detector configured to detect an opening degree of an accelerator,
wherein when the vehicle travels in a constant-speed travel mode, in the controlling of the shift of the gear stage, the electronic control unit is configured to control the shift of the gear stage to downshift to the target gear stage without preventing the downshifting on a condition that the opening degree of the accelerator detected by the opening degree detector is equal to or greater than a predetermined opening degree.

7. A vehicle control method for a vehicle comprising an electronic control unit, the method comprising controlling the electronic control unit to perform:
selecting a current gear stage that is a gear stage of the vehicle in the current travel state of the vehicle based on a travel resistance of the vehicle;
determining a next travel segment ahead of the vehicle in a travel direction, the next travel segment being a travel segment with a road slope different from that of a current travel segment where the vehicle is currently traveling; and
controlling a shift of the gear stage comprising, when the selecting of the current gear stage newly selects a target gear stage that is lower than the current gear stage while the vehicle is currently travelling in the current travel segment at the current gear stage, controlling the shift of the gear stage to maintain the current gear stage and preventing downshifting from the current gear stage to the target gear stage, on a condition that the vehicle is able to travel in the next travel segment at the current gear stage since drive force of the vehicle corresponding to the current gear stage exceeds a travel resistance of the vehicle in the next travel segment and that a stall amount of the vehicle when the vehicle travels in the current travel segment at the current gear stage is equal to or smaller than a predetermined threshold,
wherein in a state where the downshifting is prevented, when where a state of the vehicle satisfies a predetermined condition, the controlling comprises controlling the shift of the gear stage to downshift to the target gear stage without preventing the downshifting.

* * * * *